Dec. 4, 1951 G. M. YULICH 2,577,393
AUTOMATIC MULTIPLE KNIFE SHARPENING MACHINE
Filed Feb. 20, 1950 10 Sheets-Sheet 1

Inventor,
George Michael Yulich
By: Schneider & Dressler
Attys.

Dec. 4, 1951 G. M. YULICH 2,577,393
AUTOMATIC MULTIPLE KNIFE SHARPENING MACHINE

Filed Feb. 20, 1950  10 Sheets-Sheet 2

Inventor
George Michael Yulich,
By Schneider & Dressler,
Attys

Dec. 4, 1951 — G. M. YULICH — 2,577,393
AUTOMATIC MULTIPLE KNIFE SHARPENING MACHINE
Filed Feb. 20, 1950 — 10 Sheets-Sheet 3

Inventor,
George Michael Yulich,
By Schneider & Dressler
Attys.

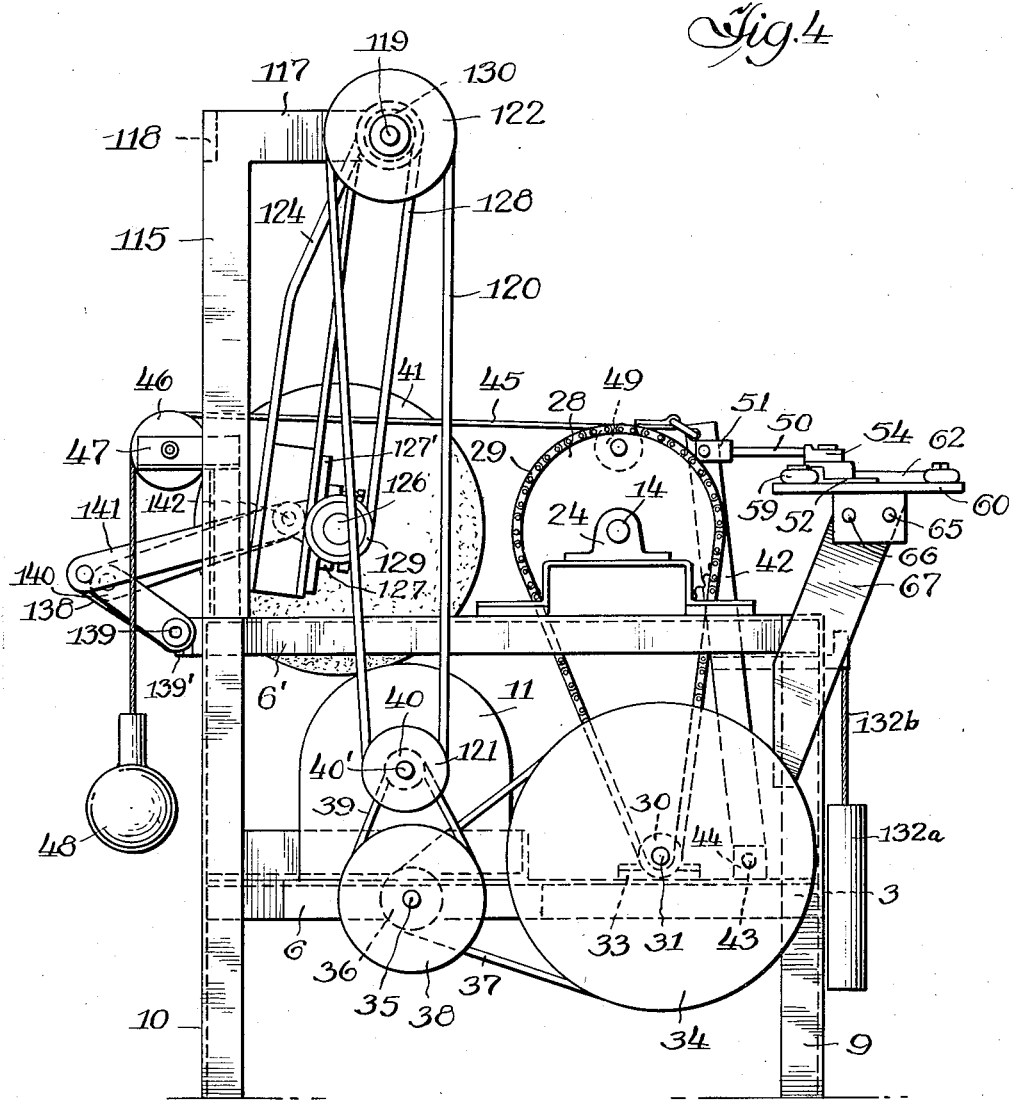

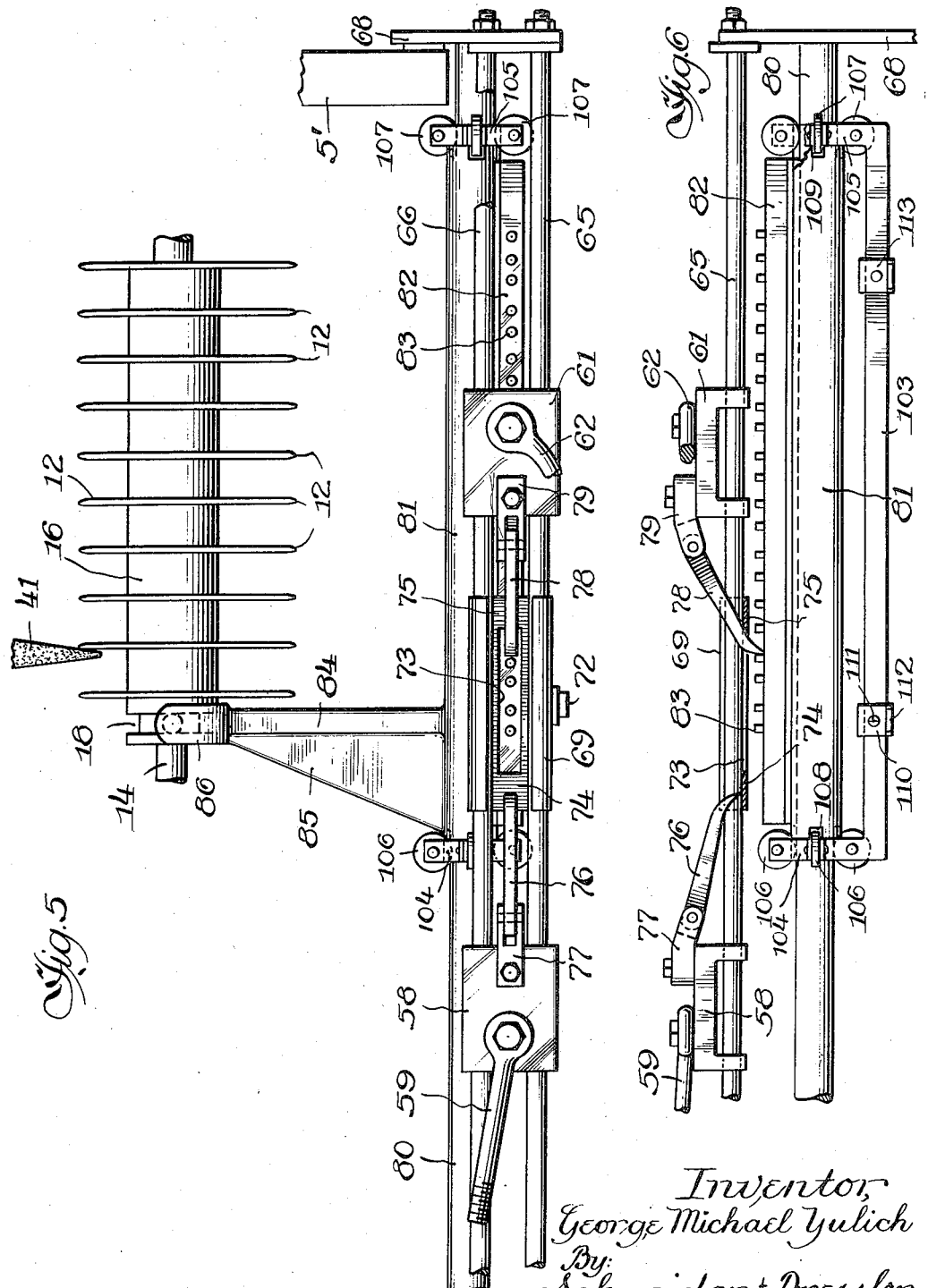

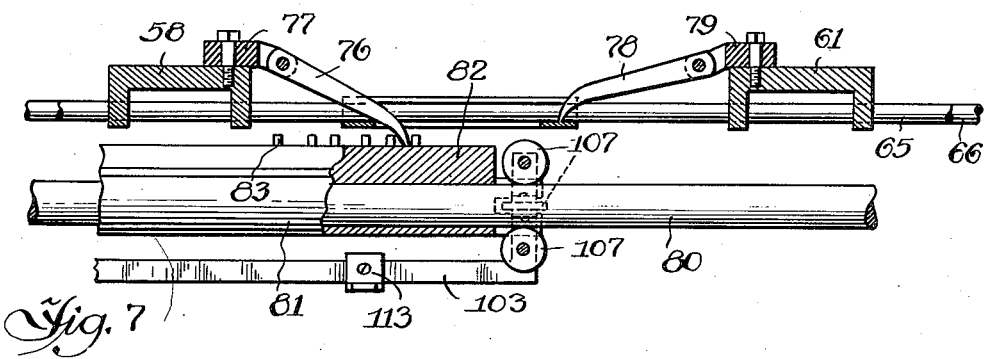

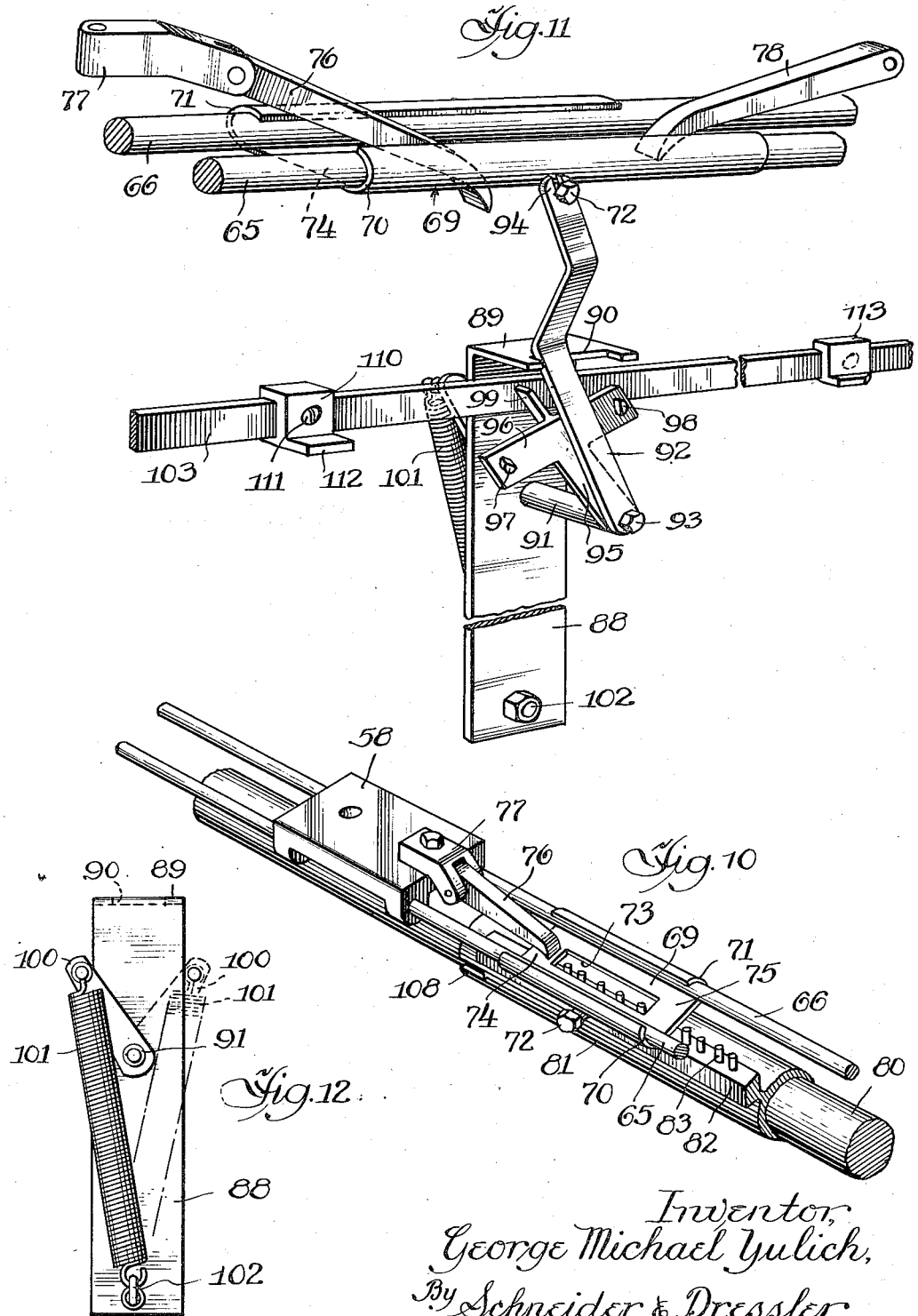

Dec. 4, 1951          G. M. YULICH          2,577,393
AUTOMATIC MULTIPLE KNIFE SHARPENING MACHINE
Filed Feb. 20, 1950                    10 Sheets-Sheet 8
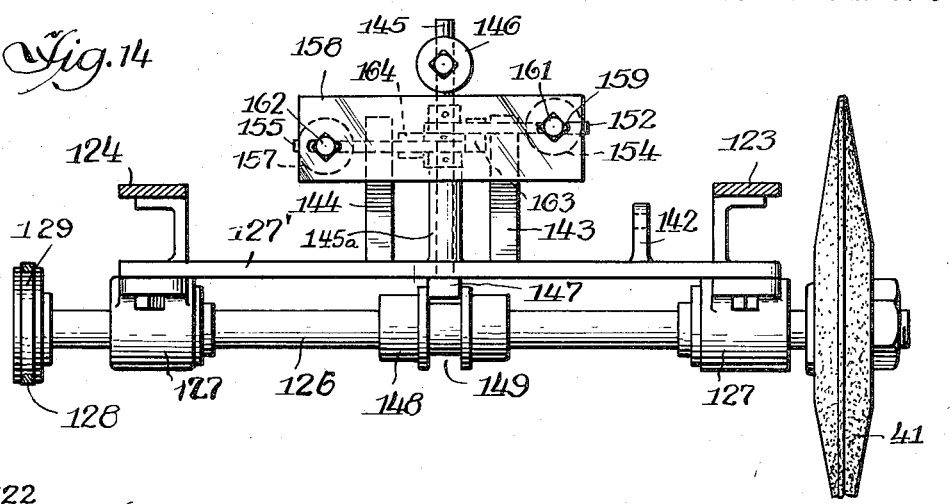
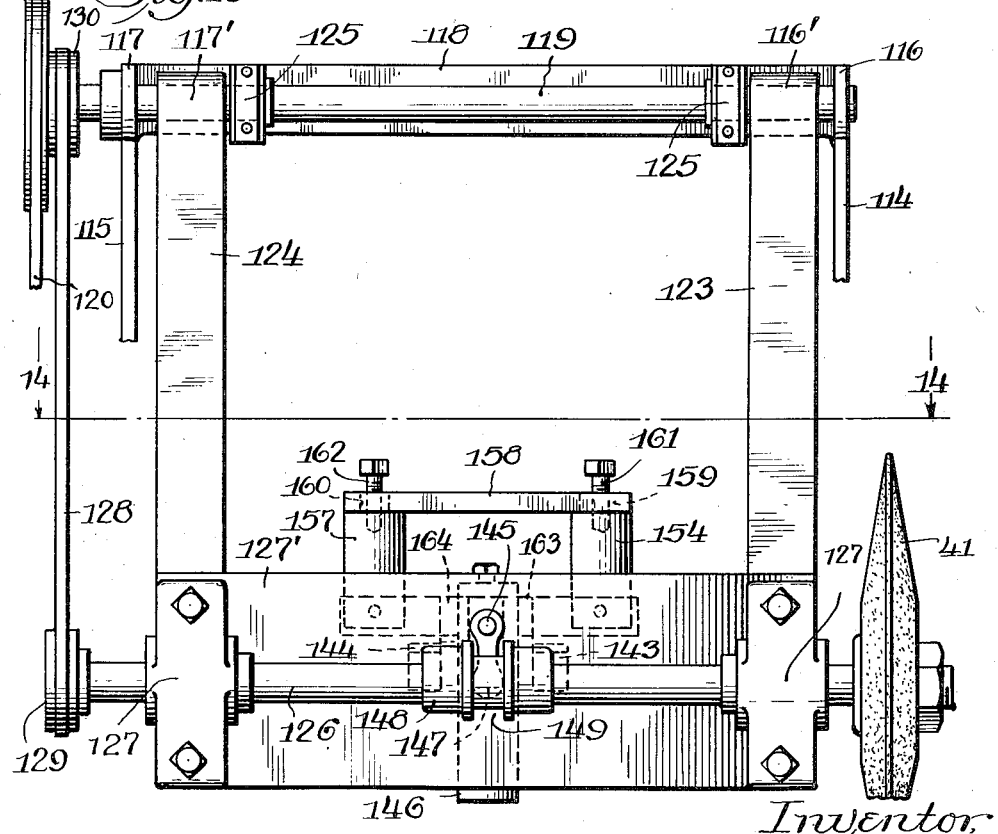
Inventor
George Michael Yulich,
By Schneider & Dressler
Attys.

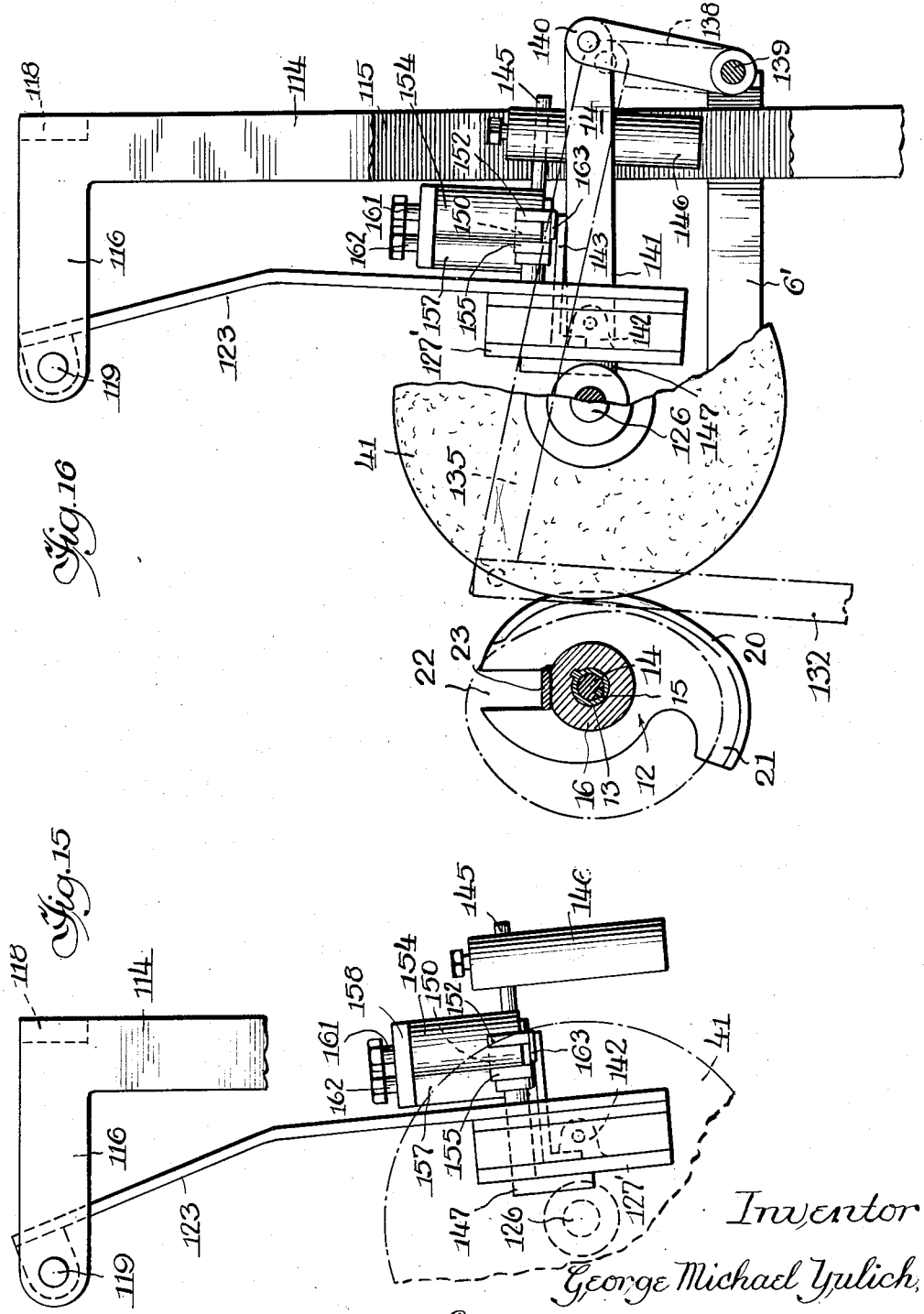

Dec. 4, 1951  G. M. YULICH  2,577,393
AUTOMATIC MULTIPLE KNIFE SHARPENING MACHINE
Filed Feb. 20, 1950  10 Sheets-Sheet 10
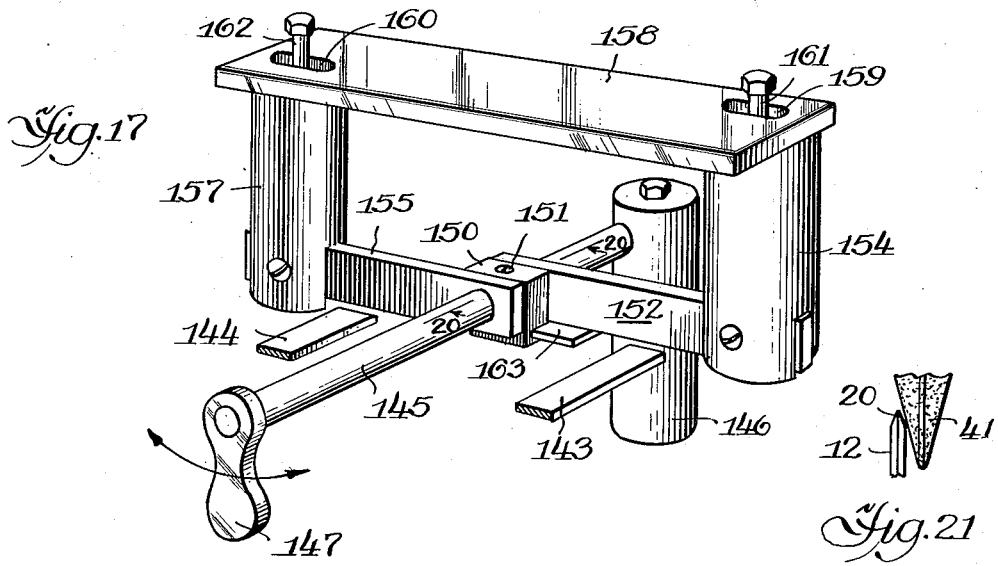
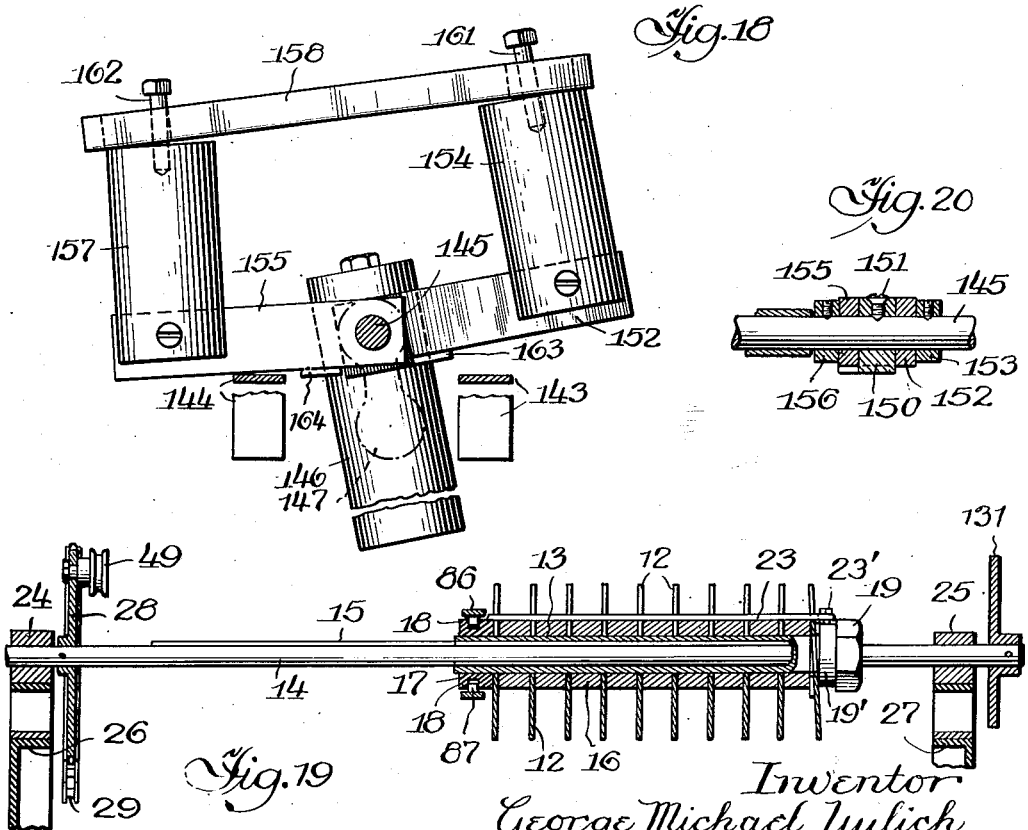
Inventor
George Michael Yulich
By Schneider & Dressler, Attys.

Patented Dec. 4, 1951

2,577,393

UNITED STATES PATENT OFFICE 2,577,393

AUTOMATIC MULTIPLE KNIFE SHARPENING MACHINE

George Michael Yulich, Kansas City, Kans., assignor to Wilson & Co., Inc., a corporation of Delaware Application February 20, 1950, Serial No. 145,119

33 Claims. (Cl. 51—33)

This invention relates to an automatic multiple knife sharpening machine particularly adapted to sharpen a plurality of irregularly shaped cutting knives ganged on a rotating shaft.

The knives, the cutting edges of which may have an irregular contour, are mounted in predetermined, laterally spaced relationship on a shaft which rotates at a relatively slow speed. A grinding wheel, rotating at a relatively fast speed, is automatically moved into contact with one side of the cutting edge of one of the knives. A cam mechanism and a stabilizer mechanism cooperate to cause the grinding wheel to follow the irregular contour of the cutting edge with uniform pressure against the beveled side of the cutting edge until the knife being sharpened has made one complete revolution. The knife assembly is then moved laterally automatically to position the opposite beveled side of the cutting edge of the same knife into proper alignment with the grinding wheel, and the grinding operation is repeated on that side. After the knife completes another revolution, the knife assembly is again automatically moved laterally to align the adjacent beveled side of the cutting edge of the next knife with the grinding wheel. The operations are continued until both beveled sides of the cutting edge of each of the knives have completed one revolution in engagement with the grinding wheel. The direction of lateral travel of the knife assembly is then reversed, and the grinding wheel continues sharpening both surfaces of the cutting edge of each knife in regular sequence until the machine is stopped. When all of the knives have been properly sharpened, the machine is stopped and the gang of knives which has been sharpened is replaced by another gang of knives which need sharpening.

The machine constructed in accordance with the present invention reduces the time required for sharpening the knives, and makes the cutting edges of the knives uniform on both surfaces, thereby reducing the possibility of dulling individual knives sooner than other knives used therewith. It likewise increases the total useful life of the individual knives, as the machine is found to take off less steel during the sharpening operation and enables the knives to withstand more sharpening operations. Another factor in increasing the total useful life of the knives is the fact that the machine may be adjusted so that, in operation, it will not burn the steel or ruin the temper of any of the knives. The greater uniformity in cutting edges sharpened by the machine also insures smoother operation of the apparatus in which the knives are used.

Other advantages of the machine of the present invention will become apparent upon reading the following description, taken in conjunction with the accompanying drawings, in which:

Fig. 4 is an end elevation taken from the left hand side of Fig. 1;

Fig. 5 is an enlarged fragmentary top plan view of the index mechanism;

Fig. 6 is an enlarged fragmentary front elevation of the index mechanism;

Fig. 7 is an enlarged fragmentary front view, partly in section, showing the index mechanism of Figs. 5 and 6 in a different position;

Fig. 8 is a front elevation of the index mechanism in another position;

Fig. 9 is an enlarged cross sectional view, taken along the line 9—9 of Fig. 2;

Fig. 10 is a detail perspective view of the index mechanism;

Fig. 11 is another detail perspective view of the index mechanism showing the reversing mechanism;

Fig. 12 is a cross sectional view, taken along the line 12—12 of Fig. 9, and shows a back view of parts of the reversing mechanism;

Fig. 13 is a front elevation of the swinging frame on which the grinding wheel is mounted, showing the stabilizer mechanism;

Fig. 14 is a top plan section, taken along the line 14—14 of Fig. 13;

Fig. 15 is a fragmentary side elevation of the swinging frame shown in Fig. 13 with parts broken away;

Fig. 16 is a fragmentary side elevation of the swinging frame showing the grinding wheel in contact with one side of the cutting edge of the knife being sharpened;

Fig. 17 is a detail perspective view of the stabilizer mechanism;

Fig. 18 is a fragmentary front elevation of the stabilizer mechanism;

Fig. 19 is a cross sectional view through the shaft on which the knives to be sharpened are mounted;

Fig. 20 is a cross sectional view, taken along the line 20—20 of Fig. 17; and

Fig. 21 is a detail perspective view showing the engagement of the grinding wheel with one beveled side of the cutting edge of the knife to be sharpened.

Figure 1:
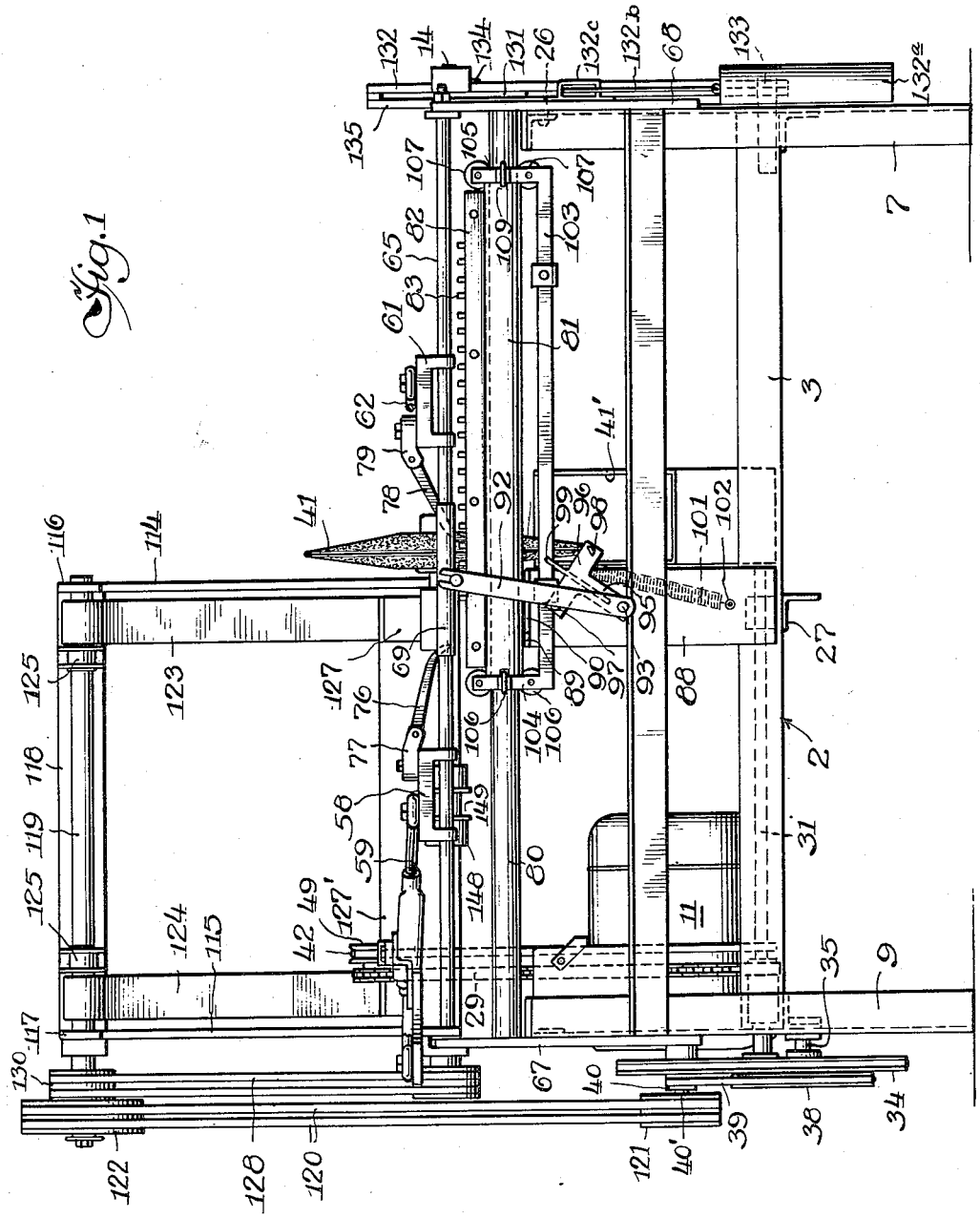
Figure 1 is a front elevation of a knife sharpening machine embodying the invention.

Referring to the drawings for a specific description of the invention, the machine comprises a supporting frame 2 having lower longitudinal frame members 3 and 4 connected by end frame members 5 and 6, and upper longitudinal frame members 3' and 4' spaced above members 3 and 4, and connected by end frame members 5' and 6', all of which are supported by vertical frame members 7, 8, 9 and 10. The upright members 7 to 10 also support a longitudinal frame member 26 and a transverse frame member 27, each positioned medially of the frame in substantially the same horizontal plane as frame members 3', 4', 5', 6'. Frame 2 supports a motor 11 which furnishes motive power for all moving parts of the machine through various driving mechanisms that will be described in detail in connection with the mechanisms with which they are associated.

A plurality of knives 12, which are to be sharpened, is ganged together on a sleeve 13 (Fig. 19) which is longitudinally movable on and is keyed to a drive shaft 14 by means of a spline 15. The knives are uniformly spaced along the sleeve by means of a plurality of spacing collars 16. One end of the knife assembly is held in place by a collar 17 having a peripheral groove 18. The opposite end of the knife assembly is held in place by a nut 19. The knives 12, as illustrated, have an irregular contour, as shown in Fig. 16, which includes a beveled cutting edge 20, as shown in Fig. 21, and a heel portion 21. The end of each knife opposite the heel portion is slotted, as shown at 22, and a flat bar 23, welded at one end to collar 17, is positioned in the slots 22 to align the knives before they are clamped in predetermined spaced relationship for the grinding operation.

The method of assembling and clamping the knives for the grinding operation is as follows. The collar 17, to which one end of flat bar 23 is welded, the spacing collars 16, and the nut 19 are permanently, but slidably mounted on shaft 14. The knives are slipped on shaft 14 individually, with slots 22 of each knife passing over the shaft, each knife being positioned between two of the spacing collars. The flat bar is then slid laterally through slots 22 to align the knives, collar 17 being positioned near the end of sleeve 13, and bolt 23' is passed through an aperture (not shown) in the free end of flat bar 23 and threaded into shank 19', which projects from nut 19, to secure the knife in the desired predetermined spaced relationship on shaft 14. After all of the knives have been sharpened they are removed from the shaft by removing bolt 23' and separating collars 16 to loosen the assembly, so that slots 22 permit each knife to be slipped off the shaft.

When employing knives of other shapes or contours, suitable precautions will be taken to properly align the knives and retain them in aligned position on sleeve 13 during the grinding operation.

Figure 3:
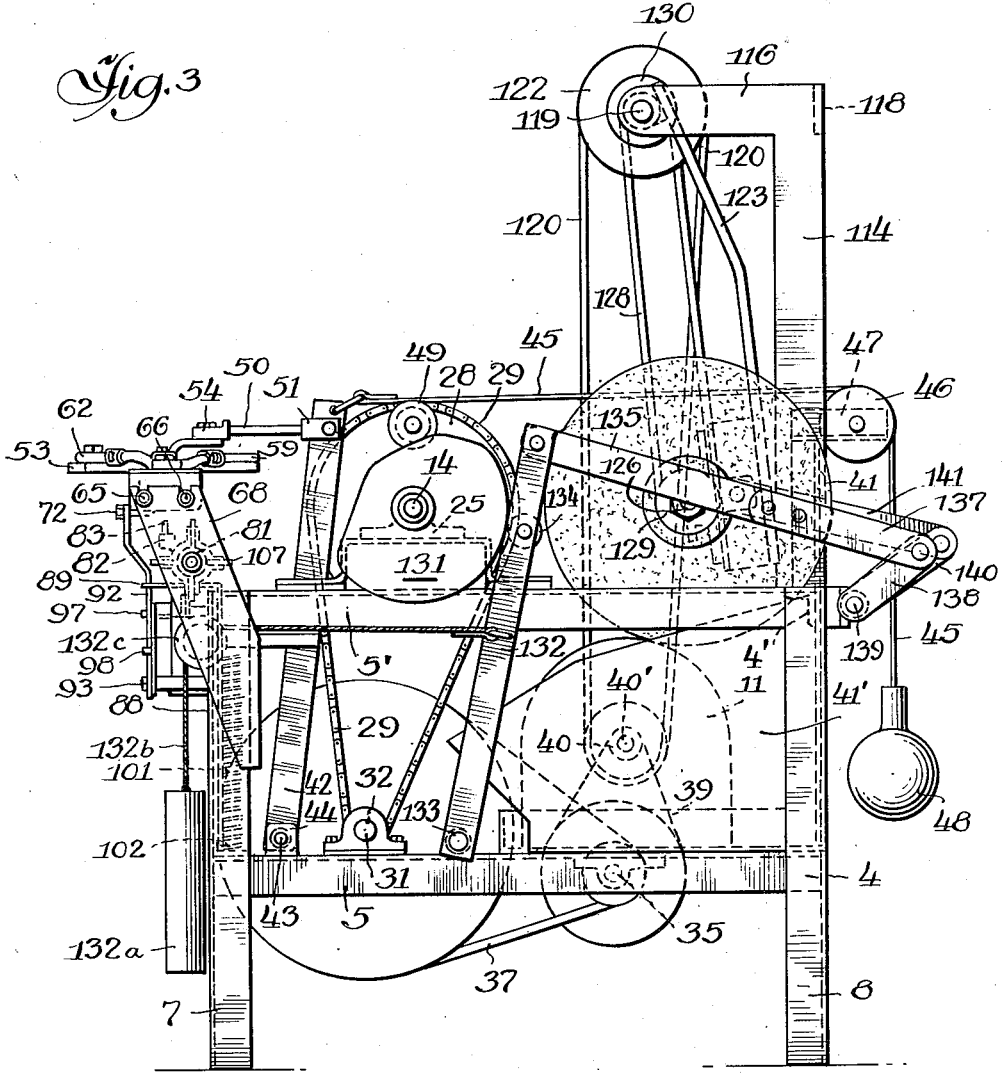
Fig. 3 is an end elevation taken from the right hand side of Fig. 1.

Shaft 14 is rotatably supported in trunnions 24 and 25 which are mounted on transverse frame member 6' and 5', respectively. As shown in Figs. 3 and 4, shaft 14 is rotated by means of a sprocket gear 28 driven by a chain 29. Chain 29 is driven by a pulley 30 secured to a shaft 31, one end of which is rotatably supported by a trunnion 32 which is mounted on frame member 27. Frame member 27 is in the same plane as frame members 5 and 6 and parallel thereto. A similar trunnion 33 on frame member 6 rotatably supports the opposite end of shaft 31. Shaft 31 is rotated by a pulley 34 driven by a shaft 35 through a pulley 36 and a belt 37. Shaft 35 is driven by a pulley 38, belt 39 from pulley 40, which is mounted on shaft 40' of motor 11 and is driven thereby. Gear 28 is considerably larger than gear 30, by which it is driven, and pulleys 34 and 38 are each larger than pulleys 36 and 40, by which they are driven, with the result that shaft 14, which carries the knife assembly, rotates very slowly compared with the speed of motor 11.

An index mechanism moves the knife assembly laterally on shaft 14 in unequal steps of predetermined length so that each beveled side of the cutting edge of each knife is successively engaged by a grinding wheel 41. The index mechanism includes an arm 42 pivoted at one end on a rod 43 supported at its ends in brackets 44 mounted on median frame member 27 and end frame member 6. A cable 45 secured to the other end of arm 42 extends over a grooved roller 46 rotatably mounted on a bracket 47 projecting from the frame. A weight 48 secured to the end of cable 45 exerts a constant force on the top end of arm 42 urging it towards the right, as viewed in Figs. 3 and 9. A roller 49, secured to sprocket gear 28 near its outer edge, engages arm 42 during a portion of each revolution of the sprocket gear when the sprocket gear is rotated. The sprocket gear rotates in a clockwise direction, as seen in Fig. 9, and each rotation moves roller 49 into engagement with arm 42. As the sprocket gear continues the clockwise movement roller 49 is moved from the dotted line position shown in Fig. 9 until it reaches its extreme left hand position, and during this portion of the revolution of the sprocket gear moves arm 42 towards the left. Continued rotation of the sprocket gear moves the roller 49 towards the right. As the roller 49 moves towards the right, the weight 48, pulling on cable 45, moves arm 42 to the right and holds it in its extreme right hand position until the roller 49 again engages arm 42.

Figure 2:
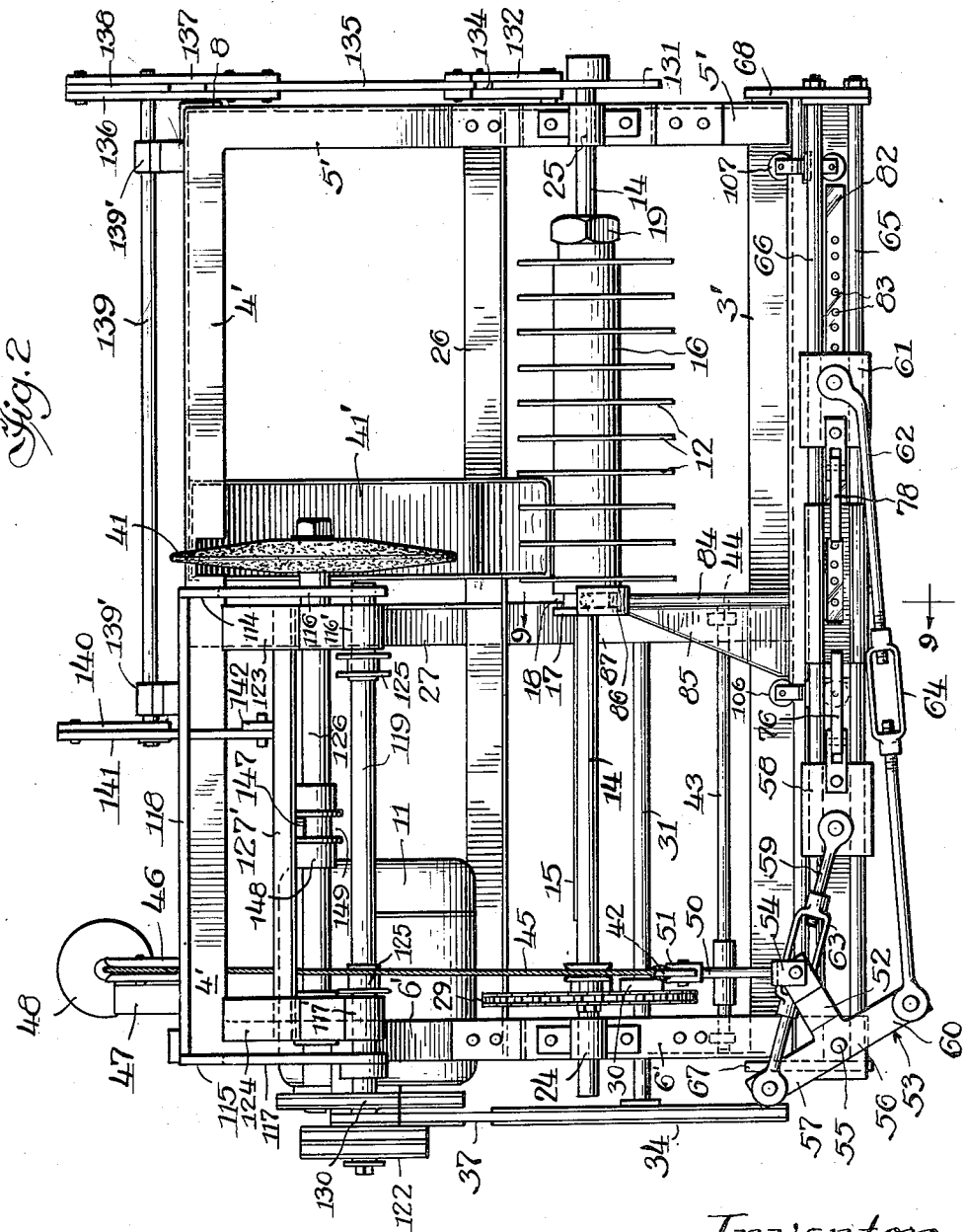
Fig. 2 is a top plan view of the machine with a gang of knives in position to be sharpened.

A rod 50 having one end secured to arm 42 adjacent its top by a clevis 51, has its other end secured to the stem 52 of a T-shaped link or double bell crank lever 53 by any suitable fastening member 54. Link 53 is pivoted to the frame, as indicated at 55 (Fig. 2), so that cross bar 56, forming the head of the T-shaped link, is oscillated as arm 42 moves back and forth around its pivot 43. One arm 57 of the cross bar is connected to a rider 58 by means of a rod 59, and the other arm 60 is connected to a similar rider 61 by means of a rod 62. Rods 59 and 62 are provided with turnbuckles 63 and 64, respectively, to facilitate adjustment of the lengths of the rods. The ends of each rod are shaped into loops, which are pivotally mounted on bolts projecting upwardly from the ends of cross bar 56; and the other loops are pivotally connected to riders 58 and 61, respectively. Consequently, when cross bar 56 is moved about pivot 55 in counterclockwise direction, as seen in Fig. 2, rider 61 is moved to the right and rider 58 is moved to the left. Movement of the cross bar in the opposite direction moves riders 58 and 61 in the opposite directions.

Riders 58 and 61 are each slidably mounted on a pair of spaced rods 65 and 66. One end of each of rods 65 and 66 is secured to a plate 67 mounted on upright frame member 9, and the opposite ends of the rods are secured to a similar plate 68 mounted on upright frame member 7. A shield 69 is mounted on rods 65 and 66 between riders 58 and 61. Shield 69 has two opposite edges curled, as indicated at 70 and 71, to fit around rods 65 and 66, respectively. A bolt 72 projects forwardly from one edge of shield 69 for a purpose hereinafter described. The shield is provided with an elongated opening 73 spaced from its opposite ends to leave relatively wide solid portions 74 and 75 at opposite ends of the elongated opening. A pawl 76 has one end pivotally secured to a clevis 77 mounted on rider 58. A similar pawl 78 has one end pivotally secured to a clevis 79 mounted on rider 61. The riders 58 and 61 and the shield 69 are so positioned that the toothed end of pawl 76 rests on solid portion 74 of the shield and the toothed end of pawl 78 projects through opening 73 in the shield when the index mechanism is to be moved towards the left, as seen in Fig. 1. When the movement of the index mechanism is reversed, the toothed end of pawl 78 rests on portion 75 of the shield and the toothed end of pawl 76 projects through opening 73, as seen in Fig. 7.

A rod 80 extends longitudinally across the frame somewhat below rods 65 and 66. A sleeve 81 slidably mounted on rod 80 has a bar 82 projecting therefrom. Bar 82 is preferably welded to sleeve 81, but may be rigidly secured thereto in any suitable manner. The upper surface of block 82 is parallel to and below the bottom of shield 69 and has a plurality of projections such as pins or pegs 83 extending vertically upwardly therefrom. Aperture 73 in shield 69 overlies bar 82 so that either pawl 76 or 78 projecting through the aperture will engage one of the pins. The spacing between pins 83 regulates the distance the knife assembly is moved laterally for each rotation of shaft 14, as hereinafter set forth, and therefore the pins are spaced to provide alternately a short movement to permit grinding wheel 41 to engage the two opposite beveled sides of the cutting edge of one knife in succession, and then a longer movement to position the adjacent sides of the cutting edge of the next knife to be sharpened into position for engagement by the grinding wheel.

The lateral movement of the knife asembly is effected by the lateral movement of either pawl 76 or 78, whichever is in engagement with pins or pegs 83, depending upon the direction in which the lateral movement is taking place. Referring particularly to Figs. 2, 5 and 6, the toothed end of pawl 78 is in engagement with pins 83 when the knife assembly is moving laterally towards the left as viewed in these figures. Every rotation of shaft 14 causes arm 42 to move back and forth one time because of the engagement of roller 49, mounted on sprocket gear 28, with arm 42, and the force exerted on cable 45 by weight 48 which pulls arm 42 back to its extreme back or right hand position, as viewed in Fig. 9, after roller 49 is disengaged from the arm. The movement of arm 42 in opposite directions moves T-shaped link 53 once in each direction about its pivot 55 for each reciprocation of arm 42.

Counterclockwise movement of link 53 about its pivot 55 moves rider 58 towards the left through rod 59, and moves support 61 towards the right through rod 62. The solid portion 74 of shield 69, upon which the toothed end of pawl 76 rests when the index mechanism is in the position indicated in Figs. 2, 5 and 6, is sufficiently broad, so that this movement of block 58 does not move the toothed end of pawl 76 off solid portion 74 of the shield. The motion of rider 61 towards the right causes the toothed end of pawl 78 to ride over the pin or peg 83 adjacent the pin with which it was in engagement at the start of the movement of the support. After pawl 78 rides over the next pin to the right the motion stops, and the pawl falls down, so that when support 61 is moved in the opposite direction, by the movement of link 53 in clockwise direction, the toothed end of pawl 78 engages said next pin 83 to move it towards the left. The simultaneous movement of support 58 to the right when support 61 is moved to the left merely moves pawl 76 back to its first position mentioned because of the width of solid portion 74, upon which the toothed end of pawl 76 has been riding.

An arm 84, rigidly secured to sleeve 81 and provided with a reinforcing web 85, extends towards shaft 14 and terminates in a semi-circular collar 86 embracing the peripheral groove 18. Each end of the collar is provided with a stud 87. Studs 87 project toward each other and fit into groove 18 of collar 17. When sleeve 81 is moved laterally by the interaction of one of the pawls 76 or 78 with one of the pins 83, arm 84, which is rigid with sleeve 81, is also moved laterally in the same direction. Studs 87 move the knife assembly the same lateral distance because the collar 17 is rigidly secured to the knife assembly. As previously mentioned, pins 83 are spaced so that the lateral movement of the knife assembly is in alternately uneven steps, one step being of a length to move the assembly far enough to align the second beveled side of the cutting edge of a knife which is being ground on one surface with grinding wheel 41, and the next step being long enough to align the adjacent side of the cutting edge of the next knife with the grinding wheel.

The direction of movement of the knife assembly is regulated by a reversing mechanism shown generally in Fig. 1, and in detail in Figs. 9, 11 and 12. A plate 88, secured to the front of supporting frame 2, extends vertically relative to the frame and has its upper end bent forwardly to form a horizontal flange 89 positioned under rod 80 and shield 69. The end of flange 89 extends forwardly of rod 80 and is provided with a notch 90. A stud 91 projects through plate 88 and is rotatable relative thereto. A lever 92, having one end rigidly mounted on stud 91 by means of a nut 93, extends through notch 90 and terminates in a bifurcated end 94 which engages bolt 72 on shield 69.

An arm 95, pivotally mounted on stud 91, is provided with a cross arm 96 having projections 97 and 98 adjacent its opposite ends. Projections 97 and 98 extend forwardly so as to engage the edges of lever 92 when arm 95 is pivotally moved a sufficient distance. Arm 95 has a projection 99 extending above the top edge of cross bar 96. A short link 100 has one end rigidly mounted on the end of stud 91 on the side of plate 88 opposite lever 92 and arm 95. When stud 91 is rotated, both lever 92 and link 100 move with it, because they are each mounted rigidly thereon. A tension spring 101 has one end secured to the free end of link 100 and its opposite end to a hook 102 mounted adjacent the lower edge of plate 88. Spring 101 is tensioned so that whenever it passes the center of stud 91 it will pull the free end of link 100 over to that side and will hold it there until stud 91 is forcibly moved in the opposite direction.

A bar 103 is provided with end members 104 and 105 which embrace rod 80 just beyond the opposite ends of sleeve 81. Members 104 and 105 each have a plurality of rollers 106 and 107, respectively, mounted so that they rotate with their peripheries in contact with the surface of rod 80. As shown, for example, in Figs. 5, 6 and 10, sleeve 81 is provided at its opposite ends with recesses 108 and 109 into which the peripheries of rollers 106 and 107, respectively, project. A stop member 110, secured on bar 103 on the left side of plate 88 as seen in Fig. 11, is adjustable laterally on the bar and may be tightened into position by means by a set screw 111. The stop member has a projecting flange 112 which engages projection 99 when bar 103 has been moved sufficiently. A stop member 113, similar to stop member 110 is mounted on bar 103 to the right of plate 88. The positions of stop members 110 and 113 may be varied in accordance with the number of knives mounted on sleeve 13.

The operation of the reversing mechanism described in the three preceding paragraphs is as follows: As sleeve 81 is moved laterally on rod 80 in either direction, bar 103 is moved therewith. Referring to Fig. 11, assume that bar 103 is being moved towards the right. When stop member 110 engages projection 99 it will force arm 95 towards the right until projection 97 engages lever 92 and moves it to the right. Since lever 92 is rigidly secured to stud 91 it will rotate the stud in a clockwise direction until spring 101 passes the center of stud 91 when the tension of the spring will cause the lever 92 to flop into its extreme right hand position. The engagement of bifurcated end 94 with bolt 72 will move shield 69 far enough to the right to position portion 74 of shield 69 under the toothed end of pawl 76. At the same time the aperture 73 moves under the toothed end of pawl 78, allowing the toothed end of pawl 78 to fall into engagement with pins 83. In this position reciprocation of support 58 moves the toothed end of pawl 76 across the surface of portion 74, out of engagement with pins 83. Reciprocation of support 61 causes the toothed end of pawl 78 to engage one of the pins 83 to move sleeve 81 longitudinally along rod 80 every time T-shaped link 53 moves support 61 to the left, thereby moving the knife assembly towards the left, until stop member 113 engages projection 99 to shift shield 69 and again reverse the direction of the movement.

The mechanism for mounting and driving the grinding wheel 41 will be now described in detail. Uprights 114 and 115 secured to the back of the frame project upwardly therefrom and are provided with forwardly extending arms 116 and 117, respectively. A cross bar 118 reinforces the upper ends of the uprights. A shaft 119 is rotatably mounted in bearings 116' and 117' at the forward ends of arms 116 and 117, respectively.

Shaft 119 is rotated by means of a belt 120 which rides over a pair of pulleys 121 and 122. Pulley 121 is rigidly mounted on shaft 40' of motor 11, and pulley 122 is rigidly mounted on shaft 119. A swinging frame comprising a pair of bars 123 and 124 and plate 127 secured thereto, is loosely mounted on shaft 119. Bars 123 and 124 are prevented from shifting laterally on shaft 119 by means of collars 125.

A shaft 126 is rotatably mounted in bearings 127 secured to the plate 127' carried by the lower ends of bars 123 and 124. Grinding wheel 41 is rigidly mounted on shaft 126 and rotates therewith. Shaft 126 is rotated by means of a belt 128 which rides over a pulley 129, rigidly mounted on shaft 126, and a pulley 130, rigidly mounted on shaft 119. As seen in Figs. 3 and 4, pulley 122 is only somewhat larger than pulley 121, and pulleys 129 and 130 are approximately equal in diameter. Accordingly, there is relatively little reduction in speed between shaft 40' of motor 11 and shaft 126, compared to the substantial reduction in speed between shaft 40' and shaft 14 which carries the knife assembly. This difference in the speeds causes the grinding wheel to rotate at a much faster speed than the speed of rotation of the knives being sharpened.

The various mechanisms previously described are effective to rotate the knives, to move the knife assembly laterally in steps of predetermined length to align the beveled surface of the cutting edge of each knife laterally with the grinding wheel, and to rotate the grinding wheel. The mechanism for moving the grinding wheel into actual engagement with the beveled surface of the cutting edge of each knife to be sharpened will now be described in detail.

A cam 131 is rigidly mounted on shaft 14 so as to rotate therewith, as shown, for example, in Fig. 3. The contour of cam 131 is developed from that of the knives to be ground so that, as hereinafter set forth, the grinding wheel contacts the cutting edges of the knives during that part of the rotation of the knives that the cutting edges are presented to the wheel, and the wheel is withdrawn for the remainder of the rotation of the knives. If knives of other contours are to be sharpened, cam 131 may be replaced by other cams, in each case having a cam surface conforming to the contour of the knives to be ground.

A lever 132 pivotally mounted at its lower end to frame member 5, as indicated at 133, carries a laterally projecting roller 134 which engages the periphery of cam 131 to move lever 132 about its pivot in accordance with the shape of the cam as the cam rotates. A weight 132a is secured to lever 132 at about its mid-point by means of a cable 132b which runs over a roller 132c and exerts a constant force urging lever 132 towards the left, as seen in Fig. 3, to hold roller 134 in contact with the periphery of cam 131. A link 135, pivotally connected at one end to the upper end of lever 132, is secured rigidly at its other end to a pair of spaced links 136 and 137. A link 138, pivotally mounted at one end between links 136 and 137, has its other end secured to one end of a rod 139. Rod 139 is mounted on a pair of bearings 139' mounted on frame member 4'. A link 140 is fixed to the opposite end of rod 139. Link 140 is similar to link 138, and its other end is pivotally secured to one end of a link 141. The other end of link 141 is secured to a lug 142 mounted on the back of plate 127 of the swinging frame carrying the grinding wheel.

The weight of the swinging frame as well as weight 132a urge link 141 forwardly into the area of rotation of the knives because, as seen in Figs. 3 and 4, the lower end of the frame is positioned rearwardly of shaft 119 from which it is suspended. The upper end of lever 132 is urged forwardly, and thereby roller 134 is kept in contact with the periphery of cam 131. The conformation of the cam is such that, as the cam is rotated by shaft 14, lever 132 moves forwardly and rearwardly and thereby moves the grinding wheel the required distance to keep it in contact with the irregularly shaped edge of the knife to be sharpened as the knife is rotated by shaft 14. As shown in Figs. 1 and 2, a pan 41' is positioned near the grinding wheel to catch the grit formed by grinding the cutting edge of the knives.

As previously mentioned, the grinding wheel engages one beveled surface of the cutting edge of a knife to sharpen it, and as the knife assembly rotates, the wheel is held in contact with the cutting edge of the knife being sharpened by the action of weight 132a and by engagement with the controlling surface of cam 131. When the wheel has completed its passage in contact with the cutting edge of the knife, the cam surface forces the frame carrying the wheel away from the knife, as shown in Fig. 3. The knife assembly is then moverd laterally to permit the grinding wheel to engage the opposite beveled surface of the cutting edge of same knife, and the operation is repeated.

The bevel on the knife edge and that on the grinding wheel as well as any nick or lateral projection on the cutting edge of the knife being sharpened will tend to shift the grinding wheel laterally. It is necessary, therefore, to provide mechanism for stabilizing the grinding wheel to insure uniform lateral pressure against the beveled side of the cutting edge of the knife being sharpened.

The stabilizer mechanism includes L-shaped brackets 143 and 144 mounted on and extending rearwardly of plate 127' on which the grinding wheel shaft 126 is mounted (Figs. 13 through 18). A round rod 145 passes through plate 127' and a supporting sleeve 145a welded to the back of plate 127', and is rotatable therein. Rod 145 has a depending weight 146 adjustably secured to its rear end, and a link 147 rigidly secured to its forward end. Weight 146 rotates with the rod 145. A collar 148 rigidly fixed on shaft 126 and rotatable therewith has a circumferential groove 149 into which link 147 fits. Accordingly, any lateral shifting of grinding wheel 41, which is also rigidly secured on shaft 126, will cause a similar shifting of collar 148 and thereby turn link 147 to rotate rod 145 about its longitudinal axis.

A block 150 is fixed to rod 145 by a set screw 151 (Figs. 17 and 20). A bar 152 extending to one side of rod 145 and having one end loosely mounted on the rod is held against block 150 by a collar 153 rigidly secured to the rod, as by a set screw. On the other end of bar 152 is mounted a slotted weight 154. A bar 155, similar to bar 152, is also loosely mounted on rod 145 on the other side of block 150, and is held against the block by a collar 156 rigidly secured to the rod by a set screw. Bar 155 extends in the opposite direction from bar 152, and on its outer end is mounted a slotted weight 157 similar to weight 154. A plate 158 resting on the top of weights 154 and 157 has elongated slots 159 and 160 adjacent its opposite ends. A headed stud 161 projecting upwardly from weight 154 extends through slot 159, and a similar stud 162 projecting upwardly from weight 157 extends through slot 160. Slots 159 and 160 permit a slight lateral movement of studs 161 and 162 which is incidental to the rotational movement of rod 145 in either direction. A stop member 163 rigidly secured to bar 152 is engaged by block 150 to prevent bar 152 from moving downwardly when the latter is rotated by rod 145 in the direction of bar 152 (counterclockwise in Fig. 18, in which the motion of the parts is somewhat exaggerated for clarity). A similar stop member 164 on bar 155 is engaged by block 150 and raises bar 155 when the movement of the rod is in the opposite direction. The brackets 143 and 144 also serve to limit the downward movement of bars 152 and 153 respectively and to support them on corresponding rotary movement of rod 145.

When lateral shifting of grinding wheel 41 causes a rotation of rod 145, say in a counter-clockwise direction, as shown in Fig. 18, block 150 will engage stop 163 and cause bar 152 to rotate in an upward direction to a slight extent. At the same time the movement of block 150 will permit bar 155 to move downwardly until it engages bracket 144, which will then limit the movement of and support bar 155 and its associated weight 157. The latter weight will then no longer exert any action on the rod 145, but the weight 154, through bar 152 and stop 163 acting on block 150, will tend to rotate shaft 145 back to its normal position in which bars 152 and 155 are in balanced relation, and thereby to restore the grinding wheel shaft 126 and the wheel to their previous position. If the wheel 41 shifts in the opposite direction, a restoring action will take place through the weight 157, bar 155 and associated parts. The depending weight 146 likewise aids in restoring the wheel to its normal position in contact with the knives.

The stabilizing force exerted by weight 146, in combination with either weight 154 or 157, depending upon the direction in which rod 145 has been rotated, thus maintains grinding wheel 41 in proper engagement with the beveled side of the cutting edge of the knife being sharpened with uniform lateral pressure, so that each cutting edge of each knife is sharpened uniformly.

When the knife assembly has been mounted on shaft 14 the shaft is rotated slowly, and the more rapidly rotating grinding wheel 41 is urged forwardly by the swinging frame and laterally against one beveled side of the cutting edge of one knife by the stabilizer mechanism as described. The cam 131 causes the wheel to follow the contour of the knife. When shaft 14 has made a complete revolution the knife assembly is moved laterally to present the other beveled side of the cutting edge of the same knife to the grinding wheel. After a complete revolution of shaft 14 with the grinding wheel in engagement with the second beveled side of the cutting edge of the first knife, the knife assembly is again moved laterally to align the adjacent beveled side of the cutting edge of the next knife with the grinding wheel, and the process is repeated automatically until both beveled sides of the cutting edges of all the knives mounted on shaft 14 have been ground for one complete revolution of shaft 14. When the grinding wheel has passed over the cutting edge of the last knife, the direction of the step by step lateral movement of the knife assembly is reversed and the process is repeated. The machine may be stopped whenever the operator considers the cutting edges of all of the knives to be properly sharpened, and a different set of knives is mounted on shaft 14 after the sharpened set has been removed. In this way, the entire gang of knives is automatically sharpened, using a single grinding wheel.

Although I have described a preferred embodiment of the invention in considerable detail, it will be obvious that the description is intended to be illustrative, rather than restrictive, as many details may be modified or changed without departing from the spirit or scope of the invention. Accordingly, I do not desire to be restricted to the exact structure disclosed.

I claim:

1. An automatic multiple knife sharpening machine comprising a carrier upon which a plurality of knives to be sharpened may be clamped, means for rotating said carrier with the knives carried thereby, a swinging frame, a grinding wheel rotatably mounted on said swinging frame, means to move said grinding wheel toward the carrier to contact a knife mounted thereon, and an index mechanism automatically moving knives mounted on said carrier laterally to bring said knives successively into position to be contacted by said grinding wheel.

2. An automatic multiple knife sharpening machine comprising a carrier upon which a plurality of knives to be sharpened may be clamped, means for rotating said carrier with the knives carried thereby, a swinging frame, a grinding wheel rotatably mounted on said swinging frame, means operating on said swinging frame to move said grinding wheel toward the carrier to contact a knife mounted thereon, an index mechanism automatically moving knives mounted on said carrier laterally to bring said knives successively into position to be contacted by said grinding wheel, and a cam regulating the swinging movement of said frame to cause said grinding wheel to contact the cutting edge of the knife being sharpened during the rotation of such knife.

3. An automatic multiple knife sharpening machine comprising a carrier upon which a plurality of knives to be sharpened may be clamped, means for rotating said carrier with the knives carried thereby, a swinging frame, a grinding wheel rotatably mounted on said swinging frame, means operating on said swinging frame to move said grinding wheel toward the carrier to contact a knife mounted thereon, and an index mechanism automatically moving knives mounted on said shaft laterally in predetermined steps of unequal length to bring opposite sides of the cutting edges of said knives successively into alignment with said grinding wheel.

4. An automatic multiple knife sharpening machine comprising a carrier upon which a plurality of knives to be sharpened may be clamped, means for rotating said carrier with the knives carried thereby, a swinging frame, a grinding wheel rotatably mounted on said swinging frame, means operating on said swinging frame to move said grinding wheel toward the carrier to contact a knife mounted thereon, an index mechanism automatically moving knives mounted on said shaft laterally in predetermined steps of unequal length to bring opposite sides of the cutting edges of said knives successively into alignment with said grinding wheel, and a cam regulating the swinging movement of said frame to cause said grinding wheel to follow the contour of the cutting edge of each knife being sharpened.

5. An automatic multiple knife sharpening machine comprising a rotating shaft, a sleeve slidably mounted on said shaft, clamping means on said sleeve for holding a plurality of knives in spaced relation, a grinding wheel movable toward and away from said knives, and an index mechanism automatically moving said sleeve laterally in predetermined steps to bring said knives successively into alignment with said grinding wheel.

6. An automatic multiple knife sharpening machine comprising a rotating shaft, a sleeve slidably mounted on said shaft, clamping means for holding a plurality of knives in predetermined spaced relationship on said sleeve, a grinding wheel swingable toward and from the carrier into and out of contact with a knife on said sleeve, into the knives, and an index mechanism automatically moving said sleeve in predetermined steps to bring opposite beveled sides of the cutting edges of said knives successively into alignment with said grinding wheel.

7. An automatic multiple knife sharpening machine comprising a carrier upon which a plurality of knives to be sharpened may be clamped, means for rotating said carrier with the knives carried thereby, a swinging frame, a grinding wheel rotatably mounted on said swinging frame, means operating on said swinging frame to move said grinding wheel toward and from the carrier into and out of contact with a knife mounted on said carrier, an index mechanism automatically moving said carrier and the knives mounted thereon laterally to bring said knives successively into alignment with said grinding wheel, a cam regulating the swinging movement of said frame to keep said grinding wheel in contact with the cutting edge of the knife being sharpened, and a stabilizer mechanism for exerting lateral pressure against said grinding wheel to maintain engagement of said grinding wheel with the cutting edge of the knife being sharpened.

8. An automatic multiple knife sharpening machine comprising a carrier upon which a plurality of knives to be sharpened may be clamped, means for rotating said carrier with the knives carried thereby, a swinging frame, a grinding wheel rotatably mounted on said swinging frame, means for swinging said frame to move said grinding wheel toward and from the carrier into and out of contact with a knife mounted on said carrier, an index mechanism automatically moving said carrier and the knives mounted thereon laterally in predetermined steps of unequal length to bring opposite sides of the cutting edges of each of said knives successively into alignment with said grinding wheel, and a stabilizer mechanism for exerting lateral pressure against said grinding wheel to maintain lateral engagement of said grinding wheel with the side of the cutting edge of the knife being sharpened.

9. An automatic multiple knife sharpening machine comprising a carrier means for holding a plurality of knives in spaced relation on said carrier, means for rotating said carrier and the knives carried thereby, a grinding wheel swingably mounted in proximity to said shaft to move into and out of contact with one of the knives mounted on said carrier, means for moving said knives step by step to present opposite sides of each cutting edge of said knives in succession to said grinding wheel, and a stabilizer exerting lateral pressure against said grinding wheel to hold it in engagement with the surface of the cutting edge of the knife being sharpened.

10. An automatic multiple knife sharpening machine comprising a carrier, means for holding a plurality of knives in spaced relation on said carrier, means for rotating said carrier and the knives carried thereby, a grinding wheel swingably mounted in proximity to said shaft to move into and out of engagement with one of the knives mounted on said carrier, means for moving said knives step by step to present opposite sides of each cutting edge of said knives successively to said grinding wheel, a cam controlling the swinging movement of said grinding wheel to cause said grinding wheel to follow the contour of cutting edge of the knife being sharpened while in engagement therewith, and a stabilizer exerting lateral pressure against said grinding wheel to hold it in engagement with the surface of the cutting edge of the knife being sharpened.

11. An automatic multiple knife sharpening machine comprising a rotating shaft, a sleeve slidably mounted on said shaft and rotatable therewith, clamping means on said sleeve for holding a plurality of knives in spaced relation, a grinding wheel movable toward and away from said sleeve, an index mechanism automatically moving said sleeve laterally in predetermined steps in one direction to bring said knives successively into alignment with said grinding wheel, and reversing mechanism for changing the direction of travel of said sleeve after each of said knives has been moved into lateral alignment with said grinding wheel.

12. An automatic multiple knife sharpening machine comprising a rotating carrier, means for holding a plurality of knives in spaced relation on said carrier, a grinding wheel swingably mounted in proximity to said shaft to move toward and away from said carrier and the knives mounted thereon, means for moving said knives laterally step by step to present opposite sides of the cutting edges of each of said knives successively to said grinding wheel, said last mentioned means being operative to move said knives one step after each revolution of said carrier, and reversing mechanism to automatically change the direction of lateral travel of said knives when each surface of every knife to be sharpened has been engaged with said grinding wheel for one revolution of said shaft.

13. In a knife sharpening machine, a rotatable shaft, a sleeve mounted on said shaft, said sleeve carrying a plurality of knives in predetermined spaced relationship, a grinding wheel movable toward and away from said sleeve to engage a knife mounted thereon, a rod extending parallel to said shaft, a sleeve slidably mounted on said rod, means to move said second mentioned sleeve stepwise laterally, and an arm extending from said last mentioned sleeve and engaging said first mentioned sleeve, whereby said first mentioned sleeve is moved laterally with said second mentioned sleeve to align said knives laterally successively with said grinding wheel.

14. In a knife sharpening machine, a rotatable shaft, a sleeve mounted on said shaft, said sleeve carrying a plurality of knives in predetermined spaced relationship, a grinding wheel movable toward and away from said sleeve to engage a knife mounted thereon, a rod extending parallel to said shaft, a sleeve slidably mounted on said rod, and connected with said knife-carrying sleeve to cause both sleeves to move together, a bar rigidly connected with said second mentioned sleeve, a plurality of projections on said bar, a pawl movable to engage said projections, and means for moving said pawl laterally whereby both of said sleeves are moved simultaneously to align said knives laterally successively with said grinding wheel.

15. In a knife sharpening machine, a rotatable shaft, a sleeve mounted on said shaft, said sleeve carrying a plurality of knives in predetermined spaced relationship, a grinding wheel movable toward and away from said sleeve to engage a knife mounted thereon, a rod extending parallel to said shaft, a sleeve slidably mounted on said rod and connected with said knife-carrying sleeve to cause both sleeves to move together, a bar rigidly connected with said second mentioned sleeve, a plurality of projections on said bar, said projections being spaced at unequal predetermined intervals, a pawl movable to engage said projections, and means for moving said pawl laterally, whereby said knives are moved laterally in accordance with the spacing between said projections to align the sides of each of said knives laterally successively with said grinding wheel.

16. In a knife sharpening machine, a rotatable shaft, a sleeve mounted on said shaft, said sleeve carrying a plurality of knives in predetermined spaced relationship, a grinding wheel movable toward and from said sleeve to engage a knife mounted thereon, a rod extending parallel to said shaft, a sleeve slidably mounted on said rod, and connected with said knife carrying sleeve to cause both sleeves to move together, a bar rigid with said second mentioned sleeve, a plurality of projections on said bar, a pair of oppositely disposed pawls, means for moving said pawls simultaneously in opposite directions, and a shield disposed between said pawls and said projections, said shield being constructed and arranged so as to permit one of said pawls to engage said projections and to prevent the other of said pawls from engaging said projections, said pawls being effective on engaging said projections to move said knives laterally in opposite directions to successively align said knives with said grinding wheel.

17. In a knife sharpening machine as set forth in claim 16, a reversing mechanism operable automatically to shift said shield when all of said knives have been successiveyl aligned with said grinding wheel, whereby the one pawl is disengaged from said projections and said other pawl is effective to engage said projections to move said knives laterally in the opposite direction.

18. In a knife sharpening machine, a rotatable carrier, a plurality of knives mounted on said carrier, a grinding wheel movable into and out of engagement with a knife on said carrier, a double pawl mechanism operable to move said knives laterally in opposite directions to align them successively with said grinding wheel, and a shield effective to hold either of said pawls in inoperative position when said other pawl is in operative position.

19. In a knife sharpening machine, as set forth in claim 18, means for automatically shifting said shield when all of said knives have been successively aligned with said grinding wheel while moving in one direction to thereby move said operating pawl to inoperative position and said inoperative pawl to operative position, whereby the direction of lateral movement of said knives is reversed.

20. In a knife sharpening machine, a rotatable carrier, a plurality of knives mounted on said carrier, a grinding wheel mounted to swing toward and from said carrier to engage a knife mounted thereon, a mechanism operable to move said carrier laterally to align the knives successively with said grinding wheel, and a cam controlling the swinging movement of said grinding wheel to maintain said grinding wheel in engagement with the cutting edge of the knife being sharpened during rotation of the latter and to move the wheel away from the knife during lateral movement of the knife carrier.

21. In a knife sharpening machine a swingably mounted grinding wheel, a rotatable carrier, a plurality of knives mounted on said carrier, a grinding wheel mounted to swing toward and from said carrier to engage a knife mounted thereon, a double pawl mechanism operable to move said carrier laterally in opposite directions to align the knives laterally successively with said grinding wheel, a shield effective to hold either of said pawls in inoperative position when said other pawl is in operative position, and means for automatically shifting said shield when all of said knives have been successively aligned with said grinding wheel while travelling in one direction to move said operating pawl to inoperative position and said inoperative pawl to operative position, whereby the direction of lateral movement of said knife carrier is reversed, and a cam controlling the swinging movement of said grinding wheel to maintain said grinding wheel in engagement with the cutting edge of the knife being sharpened during rotation of the latter and to move the wheel away from the knife during lateral movement of the knife carrier.

22. In a knife sharpening machine, a rotatable carrier, a plurality of knives mounted on said carrier, a grinding wheel mounted to swing toward and away from said carrier to engage a knife carried thereon, a mechanism operable to move said knives laterally in opposite directions to align them successively with said grinding wheel while moving in each direction, said mechanism including reversely directed pawls, a shield effective to hold either of said pawls in inoperative position when said other pawl is in operative position, a cam controlling the swinging movement of said grinding wheel to maintain said grinding wheel in engagement with the cutting edge of the knife being sharpened, and a stabilizer exerting constant lateral pressure on said grinding wheel against the side of the cutting edge of the knife with which it is engaged.

23. In a knife sharpening machine, a rotatable carrier, a plurality of knives mounted on said carrier, a grinding wheel mounted to swing toward and away from said carrier to engage a knife carried thereon, a double pawl mechanism operable to move said carrier laterally in opposite directions to align the knives laterally successively with said grinding wheel, a shield effective to hold either of said pawls in inoperative position when said other pawl is in operative position, means for automatically shifting said shield when all of said knives have been laterally aligned with said grinding wheel while moving in one direction to move said operating pawl to inoperative position and said inoperative pawl to operative position, whereby the direction of lateral movement of said knife carrier is reversed, a cam controlling the swinging movement of said grinding wheel to maintain said grinding wheel in engagement with the cutting edge of the knife being sharpened, and a stabilizer permitting slight lateral movement of said grinding wheel effective to urge said grinding wheel into engagement with the surface of the knife being ground.

24. In a knife sharpening machine, a grinding wheel mounted on a shaft and a stabilizer mechanism exerting constant lateral pressure on said grinding wheel, said stabilizer mechanism including a rod operatively engaging said shaft for longitudinal movement thereof and means to exert pressure on said rod in opposite directions to thereby maintain the wheel under constant pressure in engagement with the side of the knife being sharpened.

25. In a knife sharpening machine, a grinding wheel and a stabilizer mechanism exerting constant lateral pressure on said grinding wheel in opposite directions to maintain it in engagement with a knife surface, said stabilizer mechanism comprising a rod rotatable by lateral movement of said grinding wheel, a weight rigidly secured to said rod to resist rotation thereof, a pair of oppositely disposed bars each having one end mounted on said rod, and a weight secured to the opposite ends of each of said bars, said last mentioned weights each cooperating with said first mentioned weight to oppose rotation of said rod in either direction.

26. In a knife sharpening machine, a shaft, a grinding wheel rotatably mounted on said shaft, a rod, a link rigidly secured to one end of said rod and engaging said shaft whereby lateral movement of said shaft in either direction rotates said rod, and a weight operatively connected to said rod, said weight being effective to oppose rotation of said rod and exert lateral pressure on the grinding wheel.

27. In a knife sharpening machine, a shaft, a grinding wheel rotatably mounted on said shaft, a rod, a link rigidly secured to one end of said rod and engaging said shaft whereby lateral movement of said shaft in either direction rotates said rod, a pair of oppositely disposed bars each having one end loosely mounted on said rod, a block rigidly secured to said rod, said bars having means engaged by said block on rotation of said rod whereby one of said rods is raised on rotation of the rod in one direction and the other bar is raised on rotation of the rod in the opposite direction, and a weight secured to each of said bars, said last mentioned weights each being effective to oppose rotation of said rod, and exert lateral pressure on the grinding wheel.

28. In a knife sharpening machine, a shaft, a grinding wheel rotatably mounted on said shaft, a rod, a link rigidly secured to one end of said rod and engaging said shaft whereby lateral movement of said shaft in either direction rotates said rod, and a weight operatively connected to said rod, a pair of oppositely disposed bars each having one end mounted on said rod, and a weight secured to the opposite ends of each of said bars, said last mentioned weights each cooperating with said first mentioned weight to oppose rotation of said rod and exert lateral pressure on the grinding wheel.

29. In a knife sharpening machine, a shaft, a grinding wheel rotatably mounted on said shaft, a rod, a link rigidly secured to one end of said rod and engaging said shaft whereby lateral movement of said shaft in either direction rotates said rod, a weight operatively connected to said rod, a pair of oppositely disposed bars each having one end loosely mounted on said rod, a block rigidly secured to said rod, said bars having means engaged by said block on rotation of said rod whereby one of said bars is raised on rotation of the rod in one direction and the other bar is raised on rotation of the rod in the opposite direction, a weight secured to each of said bars, stop members in position to be engaged by each of said bars to limit the downward movement thereof, whereby the weight on the raised bar is effective to resist rotation of the rod and to exert lateral pressure on the grinding wheel.

30. In a knife sharpening machine, a knife assembly mounted for lateral movement, a double pawl mechanism for moving said knife assembly laterally in opposite directions, a shield holding either of said pawls in inoperative position when the other of said pawls is in operative position, a bar movable laterally of said machine simultaneously with the lateral movement of said knife assembly, a plate rigidly secured to said machine, a stud projecting from said plate, an arm rotatably mounted on said stud, stop members on said bar effective to reciprocate said arm on engagement therewith, the free end of said arm engaging said shield to shift said shield laterally, whereby said operating pawl is moved to inoperative position, and said inoperative pawl is moved to operative position.

31. In a knife sharpening machine, a knife assembly mounted for lateral movement, a double pawl mechanism for moving said knife assembly laterally in opposite directions, a shield holding either of said pawls in inoperative position when the other of said pawls is in operative position, a bar movable laterally of said machine simultaneously with the lateral movement of said knife assembly, an arm operatively connected to said shield, and stop members on said bar operable to move said arm on engagement therewith, thereby shifting said shield laterally to move said operating pawl to inoperative position and said inoperative pawl to operative position.

32. In a knife sharpening machine, a swinging frame carrying a rotatable grinding wheel, a knife assembly operable to move individual knives rotatably mounted thereon into position for engagement with said grinding wheel, said grinding wheel being swingable into and out of the path of rotation of said knives, a cam operable to hold said grinding wheel in engagement with the cutting edge of the knife positioned and to move said grinding wheel away during each revolution of said knife, and a stabilizer mechanism exerting constant lateral pressure against said grinding wheel to press it against a side of the knife edge while in engagement therewith.

33. An automatic multiple knife sharpening machine comprising a rotating shaft, a knife assembly clamped on said shaft, a grinding wheel swingably mounted in a substantially fixed plane transversely of said shaft, an index mechanism automatically moving said knife assembly laterally to bring each of the knives of said assembly successively into alignment with said grinding wheel, and a cam controlling the swinging movement of said grinding wheel to maintain it in engagement with the cutting edge of the knife with which it is aligned and to move said wheel away from said knife on lateral movement of the knife assembly.

GEORGE MICHAEL YULICH.

REFERENCES CITED

The following references are of record in the file of this patent:

UNITED STATES PATENTS

| Number | Name | Date |
| --- | --- | --- |
| 181,715 | Perkins | Aug. 29, 1876 |
| 2,015,414 | Steiner et al. | Sept. 24, 1935 |
| 2,019,088 | Ott | Oct. 29, 1935 |
| 2,028,315 | Bruhl et al. | Jan. 21, 1936 |
| 2,486,119 | Coffeen | Oct. 25, 1949 |